United States Patent [19]

McConkey et al.

[11] Patent Number: 4,752,497

[45] Date of Patent: Jun. 21, 1988

[54] METHOD OF APPLYING AN IMPACT RESISTANT MOISTURE IMPERMEABLE RESINOUS COATING

[75] Inventors: Stephen E. McConkey, Islington; Gordon G. Macphail, Longbranch, both of Canada

[73] Assignee: Shaw Industries Ltd., Rexdale, Canada

[21] Appl. No.: 868,056

[22] Filed: May 29, 1986

Related U.S. Application Data

[62] Division of Ser. No. 639,799, Aug. 13, 1984, abandoned.

[30] Foreign Application Priority Data

Aug. 25, 1983 [GB] United Kingdom ............... 8322878

[51] Int. Cl.⁴ .................... B05D 5/00; B05D 1/06; B05D 3/02; B05D 7/14
[52] U.S. Cl. .................... 427/29; 427/195; 427/196; 427/201; 427/204; 427/386; 427/410
[58] Field of Search ............ 427/29, 204, 201, 196, 427/426, 386, 410, 195, 425

[56] References Cited

U.S. PATENT DOCUMENTS

| | | | |
|---|---|---|---|
| 3,177,902 | 4/1965 | Rubenstein | 138/1 |
| 3,208,868 | 9/1965 | Strobel et al. | 427/196 X |
| 3,490,934 | 1/1970 | Oakley et al. | 427/196 X |
| 3,708,321 | 1/1973 | Spieles | 427/29 |
| 3,904,346 | 9/1975 | Shaw et al. | 427/29 |
| 4,138,516 | 2/1979 | Marrs et al. | 138/145 |
| 4,142,555 | 3/1979 | Satake et al. | 138/145 |
| 4,158,371 | 6/1979 | Reusser et al. | 138/145 |
| 4,405,727 | 9/1983 | Brownscombe | 428/516 |

FOREIGN PATENT DOCUMENTS 502660 4/1976 U.S.S.R. .................. 427/204

OTHER PUBLICATIONS

Hawley, G. G., "The Condensed Chemical Dictionary", ninth edition, Van Nostrand Reinhold Company, New York, 1977, p. 408.
McConkey et al., S.N. 639,799, filed 8/13/84.
*Recommended Practices... Pipe,* Appendix 4, API Recommended Practice RP5L7, American Petroleum Institute, Mar. 1, 1986, p. 12.
*Product Data, Scotchkote ® 206N Fusion Bonded Epoxy Coating,* data sheet, 3M, Jun. 1979.
*Product Specifications, Mobilox* TM *Fusion Bonded Pipe Coating*–1004–R1, data sheet, Mobil, 1978 or 1979.
*Napko ® Pipe Coatings,* 7–0007 *Nap-Gard ® Liner,* data sheet, Napko ® Pipe Coatings, Houston, Tex., 1980 (or before).
*External Fusion Bond Epoxy Coated Steel Pipe,* Test Methods, CAN/CSA-Z245.20-M86, Canadian Standards Association, Aug. 1986, pp. 30–31.

*Primary Examiner*—Evan K. Lawrence

[57] ABSTRACT

A method of forming an impact-resistant, moisture impermeable coating on the surface of an object, such as a pipe, comprises heating the object to a temperature above which a thermosetting resin applied to the heated surface will fuse, so that the resin forms a continuous layer. Before the layer of resin has gelled, a second layer consisting of a finely divided particulate mixture of the resin and a solid such as glass fiber or mica is applied over the first layer. The two layers are fused together to form a homogeneous resin covering with one layer reinforced by the above solid. The resin coating is then cured and the object allowed to cool. An apparatus for carrying out the method is also described.

5 Claims, 2 Drawing Sheets

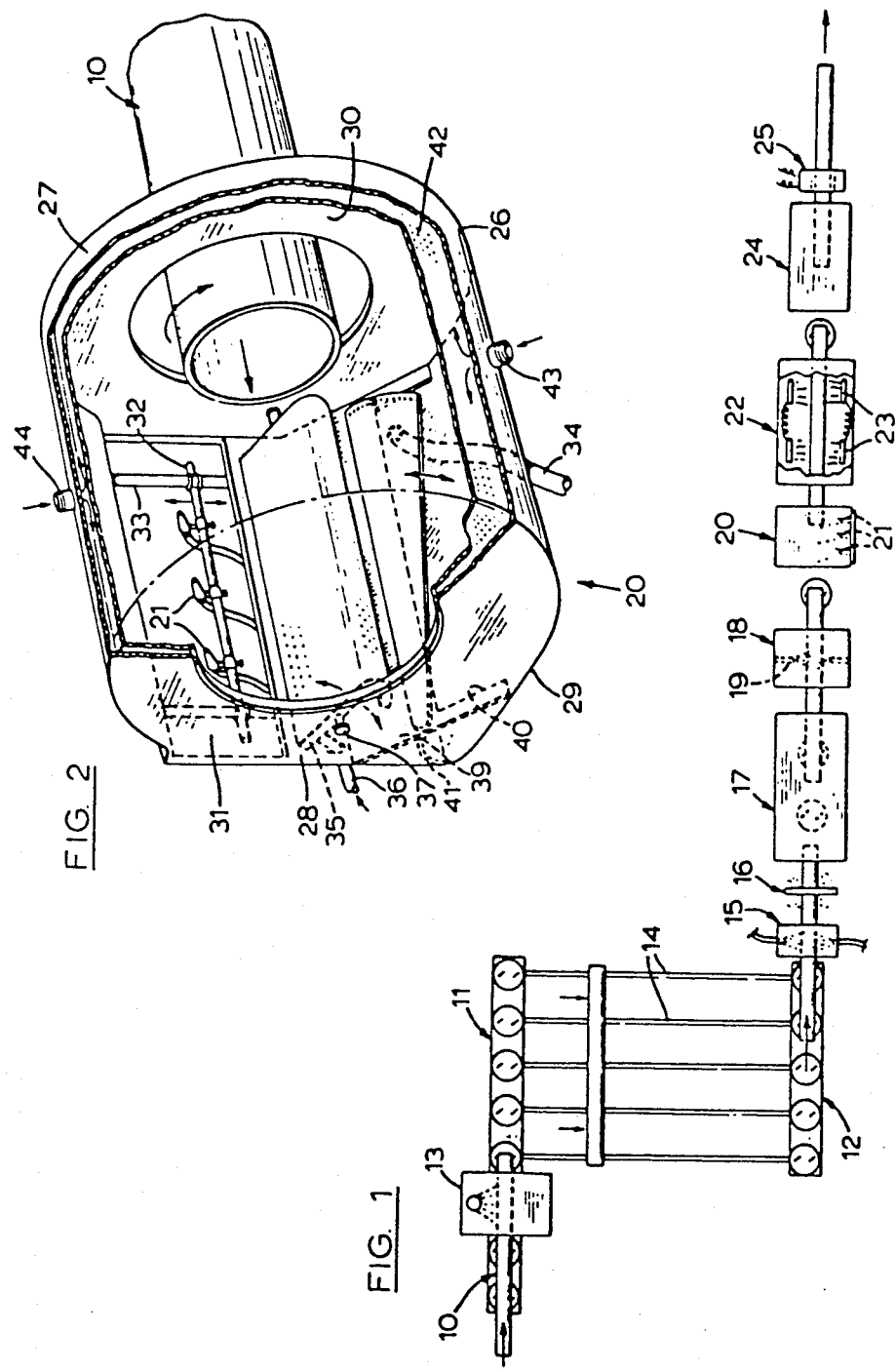

METHOD OF APPLYING AN IMPACT RESISTANT MOISTURE IMPERMEABLE RESINOUS COATING

CROSS REFERENCE TO RELATED APPLICATION

The Application is a division of my co-pending application Ser. No. 639,799, filed on Aug. 13, 1984, now abandoned.

FIELD OF THE INVENTION

This invention relates to the coating of metal objects with powdered resinous materials. More particularly, it relates to the coating of steel pipes and pipe sections with powdered thermosetting resins, such as epoxy resins, although it is to be understood that the invention is applicable also to the coating of other metallic objects such as reinforcing bars to be used in concrete reinforcement.

BACKGROUND OF THE INVENTION

The provision of thermally and/or electrically insulating coatings of epoxy resins on steel pipe sections, for example, which are intended to be used to form fluid conducting pipelines, either above or below the ground, is known. Customarily, the process involves the spraying of the epoxy resin in powder form onto steel pipe electrostatically. After abrasive cleaning of the pipe surface, e.g. by shot blasting, the metal pipe is heated, given an electrical charge, and epoxy resin powder charged oppositely to the pipe is applied to the pipe by spraying, so that the powder adheres electrostatically to the pipe surface. The coating cures on the hot pipe thereon. The epoxy resin powder which does not adhere to the pipe surface after spraying is collected and returned to the epoxy powder storage hopper to be recycled. One electrostatic powder coating process of this type is described in U.S. Pat. No. 3,904,346 dated Sept. 9, 1975.

In the case of an epoxy coated steel pipe or the like in which the resin coating provides a moisture impermeable barrier around the pipe, it is important that the coating should withstand without rupture any impact to which it would normally be subjected, as in the subsequent handling of the pipe, or its installation and use in the field, or in the application of concrete cladding in some cases for particular applications. The coating is normally very thin, typically a few mils, and cannot usefully be made thicker as this would result in its becoming brittle.

SUMMARY OF THE INVENTION

The present invention provides an improved method of coating a metallic object, such as a steel pipe, in which the resultant coating is reinforced so as to withstand impact while remaining impermeable to moisture.

According to one aspect of the present invention there is provided a method of forming an impact resistant moisture impermeable resinous coating on the surface of a metallic object which comprises applying a thermosetting resin onto said surface, the surface having been heated to a temperature above the fusion temperature of the resin and the resin being fused thereon to form a first continuous layer, applying onto said layer before it has gelled a finely divided mixture consisting of said resin and a particulate solid to form a second continuous layer covering the first layer, the layers fusing together to form a homogeneous resin covering with the particulate solid reinforcing the second layer, and cooling and curing the applied resin. The particulate solid consists essentially of inorganic particles, such as glass fibres or mica flakes.

The resin of the first and second layers may be applied in liquid form, although in many cases it will be more convenient to apply the resin in powdered form in which case it may be applied by electrostatic spraying as described hereinafter.

The resin is preferably an epoxy resin, and the particulate solid reinforcement may consist of glass fibres or may consist of mica flakes, although it has been found that mica flakes are less effective than glass fibres. The particular solid reinforcement content of the mixture for the second layer should be in the range 5–30% by weight, and is preferably about 20% by weight for optimum impact strength and ease of application.

According to another aspect of the invention, in a metallic object having an impact resistance moisture impermeable coating thereon, the coating consists of inner and outer layers fused together to form a homogeneous covering, the outer layer being reinforced by a particulate solid reinforcement embedded therein and the inner layer being devoid of such reinforcement.

The object may be a cylindrical pipe on which the inner resin layer acts as a thin moisture-impermeable barrier while the reinforced outer layer affords impact resistance. However, the outer layer may afford the additional advantage of surface roughness for certain applications, as when a concrete cladding is to be applied to the pipe, so as to enhance the adhesion of the concrete. The property of surface roughness to enhance adhesion to concrete is also especially advantageous where the metallic object is a steel bar for concrete reinforcement.

The invention has been primarily developed in connection with the application of powdered epoxy resin electrostatically to the external surface of steel pipes, and will be further described with specific reference thereto. However, it will be appreciated that it is of wider application, and can be applied to other types of metal objects, and to other types of powdered resins, which can be applied to the metal object. Other resins capable of application electrostatically in powder form include vinyl polymers, polyethylene, polyesters, cellulose, nylon, and fluorocarbon polymers.

BRIEF DESCRIPTION OF THE DRAWINGS

The process of the invention will be further described by way of example with reference to the accompanying drawings in which:

FIG. 1 is a diagrammatic plan view of an apparatus for conducting the process of the invention;

FIG. 2 is a perspective view, partly cut away, of the powder spray chamber used in the process of the invention.

DESCRIPTION OF THE PREFERRED EMBODIMENT

Figure 3:
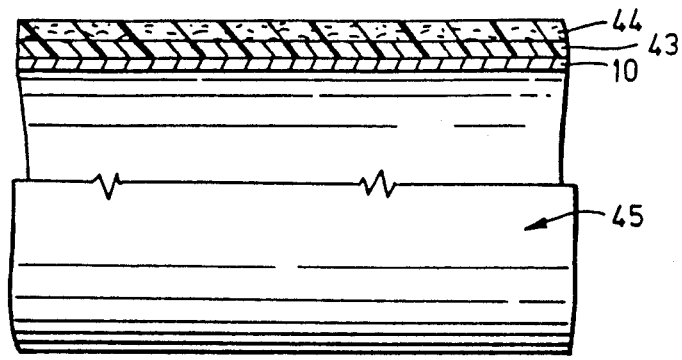
FIG. 3 is a half-sectional view of length of coated pipe.

In the drawings, like reference numerals indicate like parts.

Referring to FIG. 1 of the drawings, a cylindrical steel pipe 10 is axially advanced continuously, and with continuous rotation about its longitudinal axis, past a number of stationary treatment stations. Such advancement and rotation means may comprise first and second pipe tracks 11 and 12 defined by a plurality of pipe supporting rollers or wheels, each with its axis inclined to the direction of axial travel of the pipe 10, so that by rotating such rollers or wheels the pipe is simultaneously advanced and rotated. Such a track system is disclosed in Canadian Pat. No. 617,049, issued Mar. 28, 1961 to Leslie Shaw. In the alternative the rollers or wheels of such a track system may be replaced by chain and sprocket systems inclined to the direction of axial travel of the pipe. With this alternative arrangement, pairs of sprocket wheels are provided, one member of each pair on each side of the track, and the endless chain extending between them, so that the chains, inclined to the direction of axial travel, form cradles supporting advancing and rotating the pipe.

As it is advanced and rotated in this manner along the first pipe track 11, the pipe 10 passes a cleaning station 13, where it is abrasively cleaned, e.g. by shot blasting in the well known way. The speed of travel and rotation of the pipe 10 is adjusted to make sure that the entire exterior surface thereof is thoroughly cleaned from one or more shot blasting heads.

When the pipe 10 has travelled clear of the cleaning station 13 it is ejected from the first pipe track 11, by suitable arrangement of the track itself, onto a gently sloping ramp 14. The pipe rolls down ramp 14 and is received by the second pipe track 12. The pipe 10 is advanced and rotated by the second pipe track 12 to a high pressure water spray station 15, where the entire cleaned exterior surface of the pipe 10 is subjected to high pressure water spray. The pressure of the spray is preferably from about 1000 to about 5000 psi, most preferably about 3000 psi, and in any case high enough to remove dust particles left on the surface by the abrasive cleaning operation. As shown the spray is effected from a plurality of stationary nozzles. Alternatively a ring spray device could be provided through the centre of which the cleaned pipe passes.

Next, the pipe 10 is advanced and rotated past an air drying station 16, where cold air jets impinge upon the pipe to remove residual water from the high pressure washing. It is desirable to ensure complete drying of the pipe prior to heating and application of powdered resin, so as to avoid risk of local corrosion on the pipe, which will adversely affect adherence of the coating to the pipe. The air jets in drying station 16 operate at a pressure of from about 40 to 200 psig, preferably at about 100 psig.

Then the pipe 10 passes into and is conveyed through a heating station 17 where it is heated to a suitable temperature so that the resin subsequently applied to the surface thereof will be raised to a sufficient temperature to fuse and to commence to cure. In the case of the preferred epoxy resin, this temperature is of the order of 425° to 500° F., suitably about 450° F.

The hot pipe 10 is then electrostatically polarized by application thereto of the necessary electric charge. Then it passes, continuously and with continuous rotation, through a first electrostatic powder spray chamber 18 containing spray heads 19, from which the powdered resin, electrostatically charged, is sprayed onto the charged exterior surface of the pipe 10.

The resin fuses on the surface of the pipe to form a continuous uniform layer thereon, the thickness of this layer being in the range 0.005-0.030 inch and preferably in the range 0.010-0.015 inch.

The coated pipe 10 is fed, before the first layer has gelled, continuously and with continuous rotation, through a second electrostatic powder spray chamber 20, where a second layer of powdered material is applied electrostatically from spray heads 21 to the hot coated pipe 10. The material of the second layer is a finely divided mixture consisting of the powdered resin and a solid particulate solid reinforcing component such as glass fibres, or less than about 0.040 inch in length or finely divided mica flakes. The two layers fuse together to form a homogeneous resin covering on the pipe, the inner layer remaining devoid of particulate material and so retaining its moisture impermeable property, while the outer layer is reinforced by the particulate material embedded in it. The pipe 10 then passes through a curing station comprising an oven 22 containing infra-red irradiation heaters 23. It will not always be necessary to use the heaters 23, since in some cases, depending upon the nature of the resin being sprayed and the temperature of the pipe, curing will take place reasonably quickly without further application of heat.

After the completion of curing, whether involving heating or not, it is desirable that the coated pipe be cooled so that it can be handled easily without undue delay. For this purpose, the coated pipe 10 is then conveyed, continuously and with continuous rotation, through a quench trough 24, where it is cooled by low pressure cold water sprays.

From the quench trough 24, the pipe 10 passes through an electrical probe 25, where it encounters electrical brushes arranged to trail on the surface of the coated pipe. If a hole in the coating is encountered, the probe gives an electrical signal so that if necessary the hole can be repaired. Then the pipe 10 is conveyed away from the process apparatus, to storage.

The powder spray chambers 18, 20 used for application of the resin and the mixture respectively are shown in more detail in FIG. 2. Each chamber comprises a housing 26, of metal, or part cylindrical form, provided with a part cylindrical wall 27, an apertured planar rear wall 28 and apertured planar end walls 29, 30. The pipe 10 to be coated enters through a circular aperture in end wall 30 and departs through a circular aperture in end wall 29.

The rear wall 28 of the housing 26 is provided with a rectangular aperture 31 in which the spray guns 21 are mounted to spray resin powder or the resin mixture on the pipe 10. The spray guns 21 are adjustably clamped to a transverse bar 32, itself vertically adjustable on a frame 33, so that the positions and spray angles of the spray guns 21 can be varied at will.

An outlet pipe 34 communicates with the housing 26 near one bottom corner thereof, attached to a vacuum pump, through which overspray material is removed. A circulation of air within the housing 26 is arranged in a generally clockwise direction (viewing end wall 29) towards outlet 34, to remove the overspray powder, after the manner of a fluidized bed, as follows. A perforated baffle plate 35 is located below the aperture 31 in rear wall 28. Low pressure air is supplied continuously to the plate 35 through air duct 36. Thus air issues from the perforated baffle plate 35 in an upward direction towards the spray guns 21, thereby in conjunction with the vacuum drawn outlet 34 establishing an air flow in the aforementioned clockwise direction around the pipe 10. The direction of spray of powder from the spray guns 21 as shown contributes to this air flow pattern. The air flow pattern can be regulated by adjusting the angle of the plate 35 which is pivotable about a horizontal axis through its approximate mid-point, at 37. Further adjustment is provided by a wedge shaped damper 38 pivotally mounted in an apertured plate 39, to overlie outlet 34. The plate 39 is mounted obliquely across the corner of the housing 26 where outlet 34 is located, but extending axially the length of the housing 26. The aperture (or cut-away portion) 40 of the plate 39 is located downwardly, and wedge shaped damper 38 is pivotally mounted so as to cover cut-away portion 40 to a greater or lesser extent, with its larger end over the outlet 34. Additional control of the air flow within the housing 26 is thus provided, by pivotal adjustment of damper 38.

There is provided a part circular shield 41 in the space between the rear wall 28 of the housing 26 and the plate 39, to prevent the creation of a dead space at the junction between these members.

The part cylindrical wall 27 of the housing 26 is provided with an inner liner 42, of porous plastic, e.g. porous polyethylene. A small gap is left between the liner 42 and the wall 27. Air inlet ports 43, 44 are provided in the wall 27, through which cold air is continuously introduced between the liner 42 and the wall 27. By this means a continuous flow of air is maintained over the surface of the liner 42, thereby preventing deposit of spray powder on the liner and the housing, and preventing overheating of the liner and the housing, as a result of radiation from the hot pipe. The porous liner 42 also ensures even air flows and avoids high velocity flow pockets.

A section of the coated pipe is illustrated in FIG. 3. The inner layer 43 applied to the surface of the cylindrical metal pipe 10 is itself covered by a continuous outer layer 44 consisting of resin and a particulate solid as hereinbefore described. The two layers 43 and 44, having been fused together, form a homogeneous resin covering for the pipe.

Whilst one preferred embodiment of the process has been described with reference to the drawings, there are many variations which can be effected, in some cases dependent upon the type of resin being used and its curing characteristics. Moreover, although the apparatus shown in FIG. 1 has two spray chambers 18, 20, it is important that the pipe should remain hot so that the first resin layer will remain fused while the second resin layer is applied. In many cases it will be preferable to arrange the spray heads 19 and 21 in a single chamber wherein the two layers are applied to the pipe successively. The resin and particulate solid of the mixture to be applied as the second layer may be pre-mixed, but in general it may be more convenient to apply these components simultaneously from separate ones of the spray heads 21 so that they become mixed as they are applied to form the covering on the inner layer.

Table 1 below shows the preferred ranges of thickness for the inner and outer layers of the coating.

TABLE 1

| | MATERIAL | | |
| FILM THICKNESS | FUSION BOND EPOXY CORROSION COATING | FIBRE REINFORCED FBB LAYER | TOTAL THICKNESS |
| --- | --- | --- | --- |
| RANGE | 0.005–0.030" | 0.005–0.025" | 0.010–0.040" |
| PREFERRED RANGE | 0.010–0.015" | 0.010–0.020" | 0.020–0.030" |
| EXAMPLE FOR 120 mph CONCRETE IMPINGEMENT | 0.010–0.015" | 0.010–0.015" | 0.025–0.030" |

% fibre content -
5–30% Range
20% Usual
20% For 120 mph concrete impingement

For certain applications it has been found desirable to apply a sealing coat to the outer or second layer, so as to prevent ingress of water during processing of the pipe. In this connection the pipe is usually quenched after it has been coated and, depending upon the formulation of the resin, water used in the quenching process may enter pores of the resin and give rise to spurious readings during subsequent high voltage testing. To prevent this from happening in certain applications a third layer of resin, normally the resin of the inner layer, is applied as a sealing coat to the second layer and fused directly to it to complete the homogeneous resin covering.

We claim:

1. A method of forming an impact resistant moisture impermeable resinous coating on the surface of a metallic object which comprises applying a thermosetting resin onto said surface, the surface having been heated to a temperature above the fusion temperature of the resin, the resin being fused thereon to form a first continuous layer, applying onto said layer before it has gelled a finely divided mixture consisting of said resin and a particulate inorganic solid selected from the group consisting of glass fibres and mica flakes to form a second continuous layer covering the first layer, the layers fusing together to form a homogeneous resin covering with the particulate solid reinforcing the second layer, and cooling and curing the applied resin.

2. A method according to claim 1, wherein the resin of said first and second layers is applied in powdered form.

3. A method according to claim 2, wherein the resin of said first layer and said finely divided mixture are applied by electrostatic spraying.

4. A method according to claim 1, wherein the metallic object is a cylindrical pipe, the pipe being rotated continuously about its axis during said application, cooling and curing steps.

5. A method according to claim 1, wherein the resin is an epoxy resin.

* * * * *